United States Patent

[11] 3,537,643

[72] Inventor Lynn G. Amos
    Powell, Tennessee
[21] Appl. No. 781,716
[22] Filed Dec. 6, 1968
[45] Patented Nov. 3, 1970
[73] Assignee Corning Glass Works
    Corning, New York
    a corporation of New York

[54] OPTICAL FLUIDIC OUTPUT DEVICE
    13 Claims, 6 Drawing Figs.
[52] U.S. Cl. .................................................. 235/201,
                                       137/81.5; 116/118
[51] Int. Cl. ................................................ G06m 1/22
[50] Field of Search .................................. 235/201;
                                       137/81.5; 116/118

[56] References Cited
UNITED STATES PATENTS
3,200,525  8/1965  Francis ......................... 235/201

3,249,302  5/1966  Bowles ......................... 235/201

Primary Examiner—Richard B. Wilkinson
Assistant Examiner—Lawrence R. Franklin
Attorney—Clarence R. Patty, Jr., Walter S. Zebrowski and William J. Simmons, Jr.

ABSTRACT: A fluidic numerical display device which translates digitally coded fluidic signals into a displayed numerical output. A collimated light beam entering the device may be caused to undergo one or more reflections depending upon the state of the fluidic signals being supplied thereto. The position of emergence of the light beam from the device depends upon the number of reflections to which the beam is subjected as well as the points at which the reflections occur. Each of the possible positions of emergence is provided with a numeral which becomes visible when the light beam emerges therefrom.

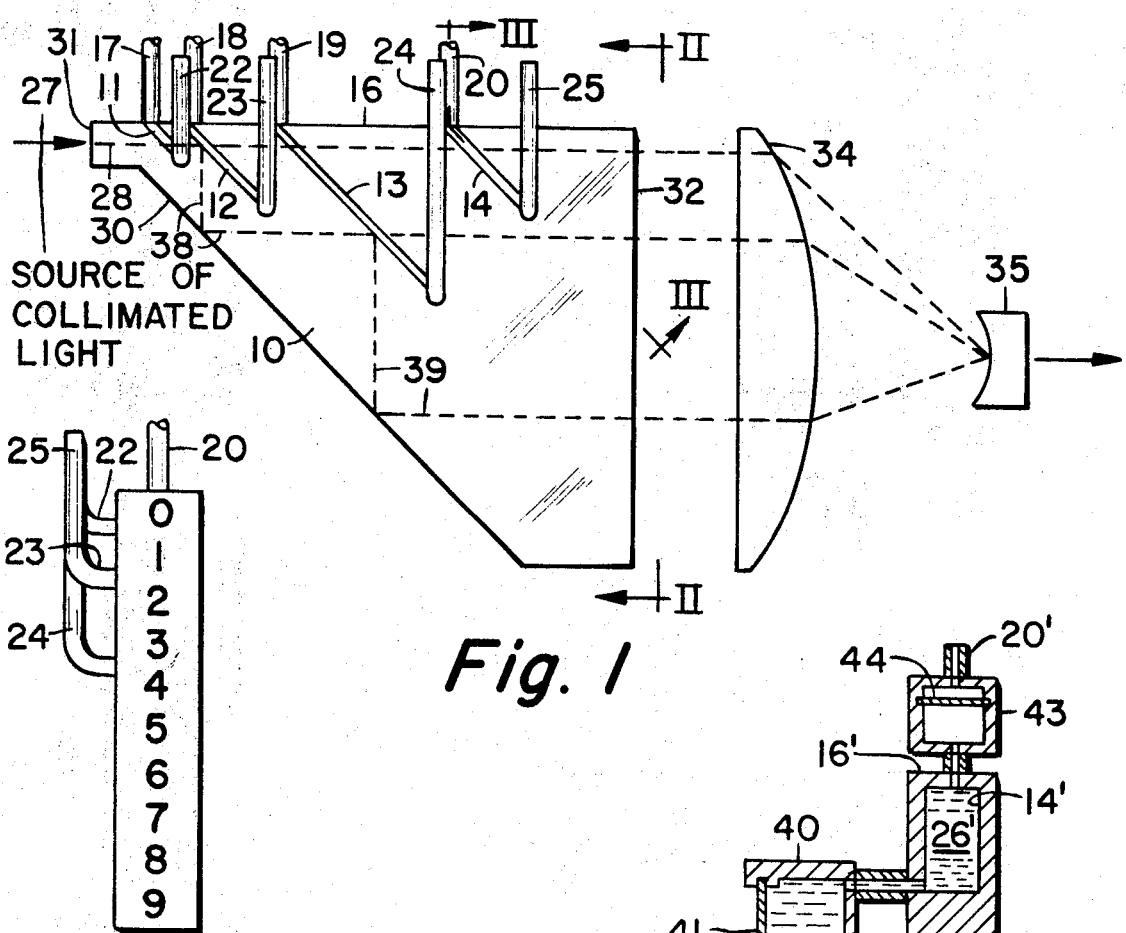
Fig. 1
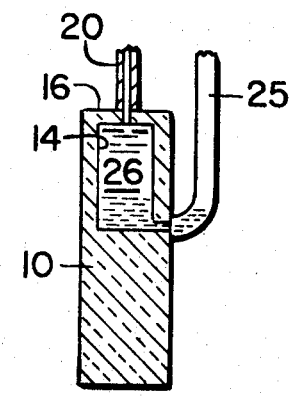
Fig. 2
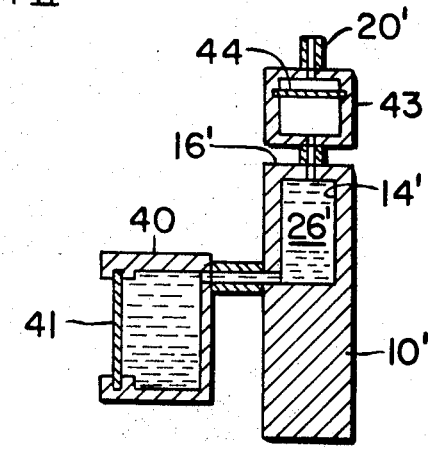
Fig. 4
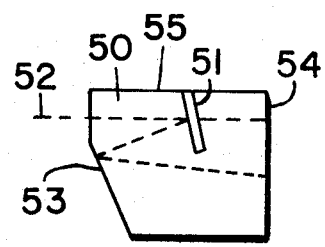
Fig. 3
Fig. 5
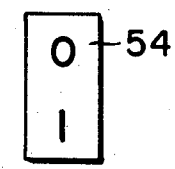
Fig. 6
INVENTOR.
Lynn G. Amos
BY
ATTORNEY 3,537,643

1

OPTICAL FLUIDIC OUTPUT DEVICE

BACKGROUND OF THE INVENTION

This invention relates to an improved output device for use in fluidic circuits and more particularly to an optical device for converting a plurality of digitally coded fluidic signals into their numerical equivalent.

Fluidic circuits are being increasingly utilized in the fields of computation, automation and control. These fluidic circuits employ logic elements to perform mathematical and decisional operations. Since the signals on which these functions are performed are in the form of a digital code, means must often be provided for indicating the decimal equivalent of the resultant coded signals. It is advantageous that such output devices be fluid operated, have few moving parts, and that they be fast acting.

U.S. Pat. No. 3,249,302 issued to R. E. Bowles discloses various types of visual readout devices wherein any one of the ten numerals 0 through 9 can be individually displayed. One of these types requires one fluidic signal for each of the ten numerals to be displayed. Another relates to matrix displays which require 35 fluidic signals to produce a 5 × 7 matrix display or seven fluidic signals to produce a bar matrix display. Still another visual readout device requiring ten fluidic signals in order to display ten numerals is disclosed in U.S. Pat. No. 3,305,171 issued to E. R. Phillips et al. A number of disadvantages are inherent in the hereinabove described readout devices. Depending on the particular readout device, from 7 to 35 fluidic signals are required to produce the numerals 0 through 9. A fluidic device such as a computer or a counter which operates on a digital code would require some type of convertor to convert the digitally coded fluidic signal into the required plurality of fluid signals necessary to operate these readout devices.

SUMMARY OF THE INVENTION

It is therefore an object of the present invention to provide a visual readout device which overcomes the disadvantages of prior art devices.

Another object of the present invention is to provide a fluidic readout device employing only moving fluids.

A further object of this invention is to provide a visual readout device for fluidic circuits.

Still another object of the present invention is to provide a visual fluidic readout device which is directly controlled by digitally coded fluidic signals.

Briefly, the fluidic output device of this invention comprises a block of transparent material having at least first and second opposed surfaces and at least one slot therein. A light beam is directed into the block through the first surface. One of the surfaces defining the slot is angularly disposed and in light intercepting relationship with respect to the light beam in the block. Means are provided for selectively supplying the slot with either a first fluid having an index of refraction which is closely enough related to that of the transparent material that the light beam substantially passes through the interface of the first fluid and the transparent material when the first fluid is in the slot or a second fluid having an index of refraction which is less than that of the transparent material by an amount sufficient to cause the light beam to reflect from the interface of the transparent material and the second fluid. Means are provided for reflecting toward the second surface any light beam which has been reflected from a slot. The second surface of the block is provided with a plurality of characters, one of the characters being displayed at any given time as the light beam passes therethrough.

BRIEF DESCRIPTION OF THE DRAWINGS

FIG. 1 is a side elevational view of a readout device in accordance with the invention.

FIG. 2 is a view taken along lines II–II of FIG. 1.

FIG. 3 is a cross-sectional view taken along lines III–III of FIG. 1.

2

FIG. 4 is a cross-sectional view of another embodiment of the invention illustrating a closed air-water system for changing the fluid in the slots.

FIGS. 5 and 6 are side and front elevational views, respectively, of a further embodiment of the invention.

DETAILED DESCRIPTION

Referring specifically to FIG. 1, the preferred embodiment of this invention comprises a transparent block 10 having a plurality of thin rectangular slots 11, 12, 13 and 14 therein. Each of the slots 11—14 respectively communicates with one of the pipes 17—20 which are affixed to a surface 16 of the block. The ends of the slots 11—14 opposite the surface 16 are respectively coupled to a plurality of pipes 22—25 which extend above the height of the slots. A first fluid 26 is disposed in the slots and the pipes 22—25 so that under conditions of equilibrium, the slots are substantially filled therewith. When a second fluid is applied to any of the pipes 17—20, the level of the first fluid 26 recedes to the bottom of the respective slot, thereby increasing the level of the first fluid in the associated pipe 22—25. The pipes 22—25 must extend above the top of the slots 11—14 for a distance sufficient to receive the first fluid from their associated slot when the slot has been completely emptied of the first fluid. If desired, the pipes 22—25 could connect to one or more reservoirs (not shown) to reduce the height to which the first fluid must be forced in order to empty the slot as well as to provide an adequate supply of the first fluid.

As used herein the term "fluid" includes such compressible fluids as air, nitrogen and other gases and incompressible fluids such as water and other liquids. The first and second fluids must be immiscible, and their indices of refraction must have certain relationships with respect to that of the block 10. The first fluid 26 must have an index of refraction which is near enough to that of the block that a collimated light beam 28, the origin of which will be hereinafter described, will not reflect from the interface of the block and the first fluid when it is present in the slots 11—14. It is well known that, in accordance with Snell's law, the angle of the slots 11—14 with respect to the direction of the light beam 28 as well as the indices of refraction of the two interface materials determine whether the light beam will reflect from the interface. The second fluid, which displaces the first fluid in a slot when a fluidic signal is applied to one of the respective pipes 17—20, must have an index of refraction which is different from that of the block by an amount sufficient to cause the light beam 28 to reflect from the interface of the second fluid and the block.

In the specific embodiment disclosed, the slots are inclined at an angle of about 45° with respect to the light beam 28. The first fluid 26 is water, the index of refraction of which is 1.3, and the second fluid is air, the index of refraction of which is 1.0. The block 10 is made from a glass having an index of refraction of approximately 1.5 or more. Obviously, other media having similar indices could be used. Also, the slots may be inclined at angles other than 45° with respect to the light beam 28 so long as the materials used cause reflection of the light beam only when a fluidic signal is applied to a slot.

The preferred embodiment illustrated in the drawings is an optical binary-to-decimal convertor which provides an optical readout for a fluidic circuit. This device converts a binary coded fluidic input to a numerical readout; however, similar devices could easily serve as decoders for other code systems. Four separate fluidic signals which represent a binary coded number are respectively coupled to the pipes 17—20. A source of collimated light 27 projects a collimated light beam 28 illustrated by the dashed line 28 through the surface 31 of the block 10. When the light reaches one of the slots 11—14, the interface which it encounters consists of two materials of different indices of refraction, and the light is refracted or reflected in accordance with Snell's law. When the collimated light beam arrives at any of the slots which are angularly disposed with respect thereto, it will pass through the slots, its direction remaining almost unchanged if the slot is filled with water. Since the index of refraction of the water is slightly lower than that of the transparent block, the light will undergo a slight parallel downward displacement as it passes through the water filled slot. However, if the slot is filled with air, the inclined interface acts like a mirror and the beam is reflected downwardly where it encounters another inclined interface at the surface 30, where it is again reflected to assume its original direction. After the collimated light beam has interacted with a plurality of slots, it emerges from and illuminates some spot on the readout surface 32 which corresponds to the decimal equivalent of the binary number formed by the air filled slots. Since the readout surface 32 contains the numerals 0 through 9 which may be affixed to the surface in any well-known manner such as engraving, printing or the like, the decimal equivalent of the binary fluidic signal is illuminated. A lens system such as that including the lenses 34 and 35 may be employed to project the displayed number onto a viewing screen.

The following specific examples are given to more clearly illustrate the operation of the readout device of FIG. 1. If the binary number 0000 is applied to the pipes 17 through 20, all of the slots 11 through 14 remain water-filled and the collimated beam of light represented by the dashed line 28 passes through all of the slots and illuminates the numeral 0 on the readout surface 32. If the binary number 0010 is applied to the pipes 17—20 so that only the pipe 18 receives a fluidic signal which causes the slot 12 to become filled with air, the light beam 28 is reflected from the surface of the slot 12 and again from the surface 30 as illustrated by the dashed lines 38. In this case the light beam emerges from the surface 32 and illuminates the numeral 2. If a fluidic signal is applied to the tube 19 as well as to the tube 18, both of the slots 12 and 13 will be air filled. Therefore the light beam 38 will be reflected from the surface of the slot 13 and again from the surface 30 as illustrated by the dashed line 39. Thus, when the binary signal 0110 is applied to the pipes 17 through 20, causing the slots 12 and 13 to become air filled, the light beam 39 illuminates the numeral 6 as it emerges from the surface 32.

The embodiment shown in FIG. 4 illustrates another apparatus for changing the fluids in a slot in response to a fluidic signal. In this FIG. elements similar to those in FIG. 3 are indicated by primed referenced numerals. The bottom of the slot 14' communicates with a reservoir 40 having a diaphragm 41 located at one end thereof. A chamber 43 having a diaphragm 44 therein is connected between the input pipe 20' and the top of the slot 14'. A closed system is thereby provided which is sealed at both ends by the flexible diaphragms 41 and 44. Assuming that air and water are also used for the fluids in this embodiment, the slot 14' and the reservoir 40 are both filled with water 26' when no fluidic signal is applied to the pipe 20'. The application of a fluidic signal to the pipe 20' causes the diaphragm 44 to deflect toward the center of the chamber 43. This tends to compress the air within the chamber 43 which then forces the water 26' from the slot 14' into the chamber 40, causing the diaphragm 41 to deflect outwardly. When the pressure of the fluidic signal appearing at the pipe 20' decreases, the diaphragms 41 and 44 assume their equilibrium positions shown in FIG. 4 and the water 26' again fills the slot 14'. Although this embodiment is somewhat more complex than that illustrated in FIG. 3, it eliminates the loss of fluid due to evaporation.

The embodiment shown in FIGS. 5 and 6 illustrates additional modifications which can be made to the device shown in FIG. 1. This embodiment includes a block 50 having a slot 51 therein. In order to simplify this embodiment, no details of the system for changing fluids in the slot 51 are shown. A collimated light beam 52 enters the block 50 by way of the surface 53 and emerges from the surface 54 at two possible locations depending upon the type of fluid present in the slot 51. In this embodiment, the slot 51 is inclined at an angle greater than 45° with respect to the surface 55. When a fluid having a relatively low index of refraction is present in the slot 51, the light beam 52 reflects from the surface of the slot 51 and then from the surface 53 and emerges at the numeral 1 at the surface 54. The light beam 52 will pass through the slot 51 when the fluid therein has an index of refraction relatively close to the material of the block 50. In this latter case the beam will emerge from the surface 54 and illuminate the numeral 0.

While several specific embodiments have been illustrated and described, it is obvious that variations of the details of construction which are specifically illustrated and described may be resorted to without departing from the true spirit and scope of the invention as defined by the appended claims.

I claim:

1. A fluidic output device comprising:
   a block of transparent material having at least first and second opposed surfaces;
   light source means for directing a beam of light into said block through said first surface;
   at least one slot within said block, said slot having one surface which is disposed in light intercepting relationship with respect to said light source means, said one surface being angularly disposed with respect to the direction of said light beam in said block;
   means for selectively supplying said at least one slot with either a first fluid having an index of refraction which is so related to that of said transparent material that said light beam substantially passes through the interface of said first fluid and said material when said first fluid is in said slot or a second fluid having an index of refraction which is less than that of said transparent material by an amount sufficient to cause said light beam to reflect from the interface of said transparent material and said second fluid;
   means for reflecting toward said second surface any light beam which has been reflected from said at least one slot; and
   a plurality of characters on said second surface, one of said characters being displayed at any given time as said light beam passes therethrough.

2. A fluidic output device in accordance with claim 1 wherein said beam of light is collimated.

3. A fluidic output device in accordance with claim 1 wherein said transparent material is glass, said first fluid is a liquid, and said second fluid is a gas.

4. A fluidic output device in accordance with claim 3 wherein said first fluid is water and said second fluid is air.

5. A fluidic output device in accordance with claim 1 which further comprises a lens system adjacent said second surface for projecting said displayed characters.

6. A fluidic output device in accordance with claim 1 wherein said means for supplying said at least one slot with said first and second fluids comprises a reservoir connected to said at least one slot, said first fluid substantially filling said slot under conditions of equilibrium, and means for introducing said second fluid into said slot, thereby driving said first fluid from said slot and into said reservoir.

7. A fluidic output device in accordance with claim 6 wherein said means for introducing said second fluid into said slot comprises a pipe connected to the top of said slot, said reservoir being connected to the bottom of said slot.

8. A fluidic output device in accordance with claim 6 wherein said reservoir is expandable and is connected to the bottom of said slot, and wherein said means for introducing said second fluid into said slot comprises a chamber, a diaphragm dividing said chamber into two parts, an input pipe connected to the first part of said chamber, the second part of said chamber being filled with said second fluid and communicating with the top of said slot.

9. A fluidic output device in accordance with claim 6 wherein said first fluid is a liquid, said second fluid is a gas, and wherein said at least one slot and said reflecting means are disposed in parallel planes.

10. A fluidic output device in accordance with claim 9 wherein said means for reflecting comprises a third surface of said block.

11. A fluidic output device in accordance with claim 9 wherein said block is provided with a plurality of said slots, the length of said slots and the spacing between said slots being such that a numerical output is provided which corresponds to a digital code which is represented by the presence or the absence of said gas in said slots.

12. A fluidic output device in accordance with claim 11 wherein said digital code is a binary code.

13. A fluidic output device in accordance with claim 1 wherein said at least one slot and said reflecting means are disposed in parallel planes.